Patented Dec. 25, 1945

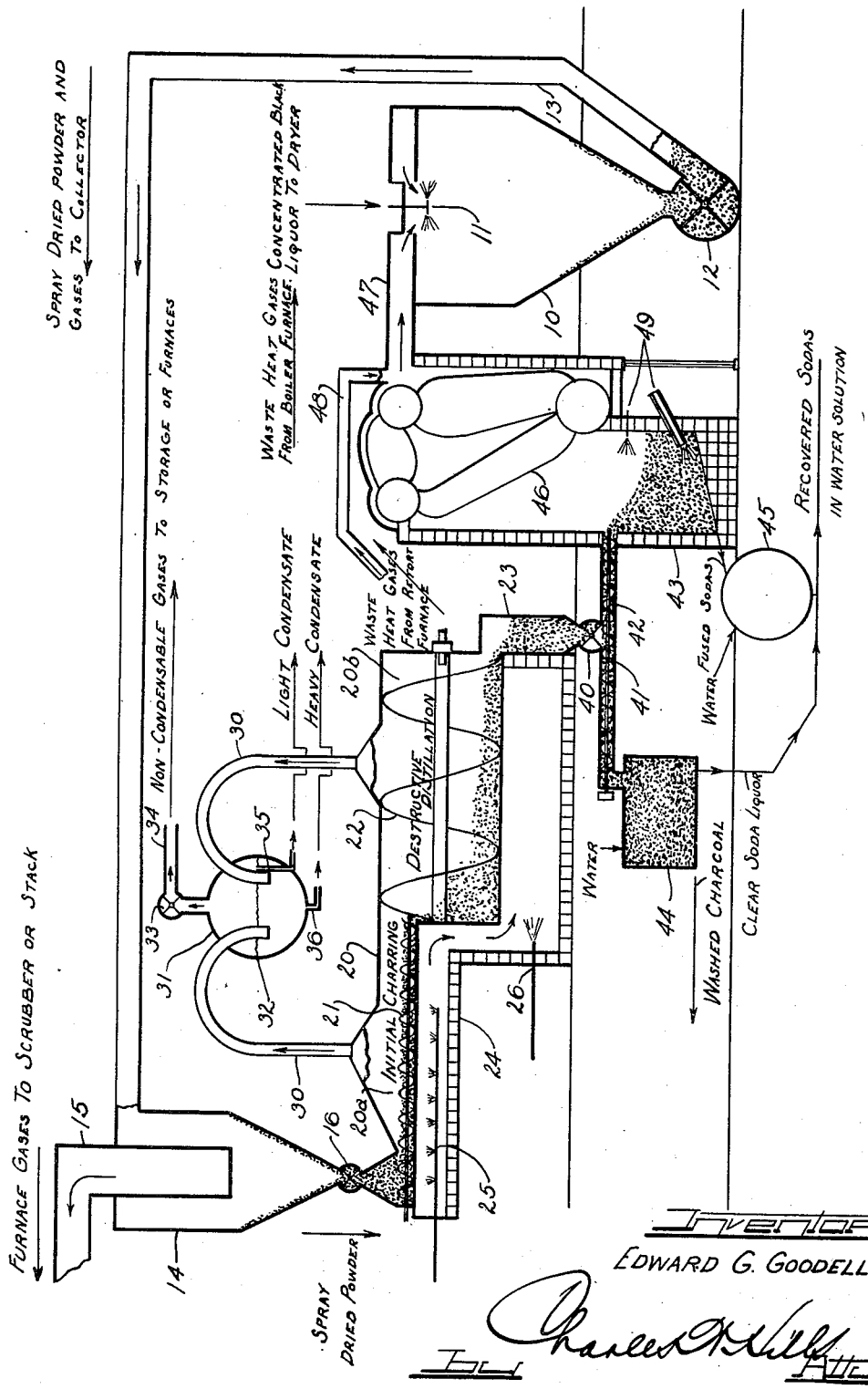

2,391,566

UNITED STATES PATENT OFFICE 2,391,566

METHOD AND APPARATUS FOR RECOVERING INORGANIC BY-PRODUCTS FROM WASTE PULP LIQUOR

Edward G. Goodell, Stevens Point, Wis.

Application December 26, 1941, Serial No. 424,412

3 Claims. (Cl. 202—19)

This application is a continuation-in-part of my applications Serial No. 282,721 (Patent No. 2,265,158) and Serial No. 387,262.

This invention relates to a method of recovering inorganic values from waste liquors such as those produced in the cooking of cellulosic materials by the soda process.

In the manufacture of chemical pulp by the soda process or modifications thereof involving, for instance, the addition of sulfur, waste cooking liquors are produced that contain, besides the inorganic chemicals originally present in the cooking liquor, much of the lignin of the wood or other vegetable material being pulped. Conventional methods of recovering values from such spent liquors include concentration of the liquor followed by combustion in a rotary furnace yielding black ash. A large portion of the inorganic chemicals actually present in the concentrated liquor is lost with the flue gases from the furnace, being either volatilized or swept away in the form of dust. This is particularly true of sodium compounds.

Efforts to recover organic by-products in a practical way from concentrated waste liquors by destructive distillation have heretofore been without success owing to difficulties encountered in the handling of waste liquors of high concentration. Waste liquors containing, for instance, above 50 per cent total solids are so extremely viscous and sticky that they cannot be caused to flow readily, nor can they be agitated mechanically. If subjected to destructive distillation in a rotary furnace, the concentrated liquor agglomerates to form sticky and gummy lumps and balls which do not readily transmit heat. If batch distillation is resorted to, the liquors foam so badly as to make such distillation practically impossible.

As pointed out in my copending applications Serial Nos. 282,721, 328,903 and 387,268, filed, respectively, July 3, 1939, April 10, 1940, and April 7, 1941, of which the present application is a continuation-in-part, I have now found that dry black liquor solids produced from waste cooking liquors by the process of my Patents Nos. 1,779,535, 1,779,536, 1,779,537 and 1,779,768, all issued on October 28, 1930, or by any other method is peculiarly adaptable to the recovery of by-products without the difficulties heretofore encountered. As the starting material for carrying out the method of my present invention, therefore, I employ a pre-dried material, preferably in the form of spray dried powder, comprising the organic and inorganic solids content of the spent cooking liquor or other waste liquor having a substantial lignin content. When obtained by the spray drying processes described and claimed in my above enumerated patents, both the organic and inorganic constituents of the spray dried powder are present in a state substantially unchanged chemically from the state in which such constituents exist in the spent cooking liquors.

More particularly, I have found that when such spray-dried powders are initially charred more or less completely at temperatures higher than those conventionally used for destructive distillation, and when the destructive distillation of the partially charred powder is carried to completion at conventional temperatures, lump formation and adherence to the walls of a retort or furnace may be avoided and a good yield of valuable volatile products of destructive distillation obtained, together with a solid residual product that contains charcoal and the inorganic constituents of the cooking liquor. Soluble sodium compounds may be recovered from this residual product by leaching.

I have further found that when mixtures of charcoal and inorganic constituents of the cooking liquor produced as hereinabove are burned, there is a smaller tendency for the sodium compounds present in this mixture to be volatilized and lost than when concentrated black liquor or black liquor solids are burned in the conventional methods of recovering the sodium compounds present therein. This lessened tendency for sodium compounds to be volatilized and lost is probably due to the almost complete absence of volatile matter in the above mentioned mixtures, while whole black liquor solids contain a high percentage (30 to 40%) of volatiles, such as sodium resinate. In other words, the methods of the present invention remove, by destructive distillation, volatile matter from black liquor solids at a temperature below the volatilization temperature of sodium compounds, and thereafter burn the combustible non-volatile fraction of the black liquor solids at a lowered temperature as compared with the conventional combustion temperature of whole black liquor solids. Thus, by conducting removal of volatiles and combustion as separate steps, the loss of sodium compounds by volatilization is greatly lessened.

Further, such lesser tendency of sodium compounds to be lost by volatilization when operating according to the present invention can be rendered harmless by utilizing the combustion gases from the burning of the charcoal-inorganic cooking liquor solids mixture referred to hereinabove for the purpose of spray drying concentrated black liquor as described and claimed in my patents identified hereinabove, whereby any sodium compounds volatilized are collected with the powdery products of the spray drying and so kept in the processing cycle. Complete avoidance of any and all losses due to volatilization whether of sodium or other compounds can be effected by carrying out the above mentioned two stage destructive distillation in a retort or furnace sealed at one end, for instance, by powder or partly charred powder being advanced thereinto and at the other end by a rotary seal or the like, the outlet duct for vapors from the retort or furnace being provided with a liquid seal or the like, so that the whole process is carried out within a sealed apparatus.

It is therefore an important object of this invention to provide an improved method for the recovery of inorganic values from waste liquors produced in the soda process or modifications thereof.

Another important object of this invention is to provide an improved method for treating waste liquors produced in the soda process including a destructive distillation step for removal of volatile organic matter from whole black liquor solids followed by a combustion of the residue from said destructive distillation at a temperature below the conventional combustion temperature of whole black liquor solids.

A further object of this invention is to provide a method of removing inorganic values from concentrated soda pulp liquor including spray drying the same, destructively distilling the spray dried product, burning the solid residue from the distillation step, and utilizing the combustion gases from the burning step for spray drying of further amounts of concentrated black liquor, the whole process being carried out within a closed system.

Still another object of this invention is to provide apparatus for carrying out the above disclosed processes.

Other and further important objects of this invention will be apparent from the following specification, the accompanying drawing and the appended claims.

In proceeding according to the present invention, I may use as a starting material the above mentioned pre-dried material obtainable by spray drying waste cooking liquors produced in the cooking of wood and other vegetable materials by the soda process. While I prefer to start with a spray dried lignin containing material, owing to the ease with which it may be handled, other methods, such as drum drying, may also be employed in the preparation of the starting material. Also, while the starting material is here referred to as "spray dried," it may nevertheless contain an appreciable percentage of water, say, upwards of 10 to 15 per cent, so long as it may be handled as a dry powder rather than as a liquid.

The pre-dried starting material, preferably in the form of a loosely powdered or granulated mass, is first charred at a temperature higher than the minimum required for destructive distillation. After the initial charring, which makes the powder relatively friable and non-sticky, destructive distillation is continued at a temperature lowered to or almost to the minimum required for destructive distillation.

The exact temperature to be maintained in the initial charring zone depends on factors such as rate of transfer of heat due to rate of movement of the spray-dried powder. Temperatures such as 1200° to 1400° F. have been found operative, although at a temperature of from 1800° to 2000° F. a greater amount of powder can be advanced through a retort in the same period of time without changing the relation of heat input to material treated. Temperatures on the order of 500° to 1200° F. effect destructive distillation of the partially charred product a temperature of from 550° to 650° F. being preferred.

Such charring and destructive distillation is effected in one or more retorts constructed of suitable heat resistant material. If desired, the initial charring can be effected in one or more retorts disposed in parallel and completion of destructive distillation carried out in another relatively larger retort. Screw conveyors or the like are used to advance the material being treated through hoppers and retorts charged from such hoppers.

Direct heating may be effected by means of burners, or electric heating may be used, even for inside moving parts such as conveyor flights.

Air is excluded from the spray-dried powder at all stages of the destructive distillation, the rotary furnace or furnaces being properly sealed against the entrance or exit of gases at their ends.

As a result of the destructive distillation, the lignin and other organic matter present in the spray-dried material are decomposed, and various organic compounds of a volatile nature, such as methyl alcohol, acetone, acetic acid, tar, and others, are formed. The vapors of these volatile organic compounds are discharged to a condenser for separate recovery. The non-volatile residue remaining after destructive distillation comprises charcoal and the inorganic solids originally present in the waste liquor.

The solid residue from the destructive distillation may be leached in a sufficient quantity of weak liquors or water. The soluble inorganic salts are thus dissolved out of the carbonaceous residue by the weak liquors to fortify the latter. Fresh chemicals may be added to the fortified liquors to replace losses and to restore the liquor to normal liquor composition. The carbon remaining after leaching may be utilized in a furnace for its heat value or may be marketed as such, after washing and removal of excess moisture.

Instead of leaching the solid residue and utilizing or marketing the leached and washed carbon as above indicated, the solid residue from destructive distillation may be charged as such into a furnace in which the carbon is burned at a temperature of from 1000° to 2500° F. and the sodium compounds are melted and run to a dissolver tank. In such case, the furnace is preferably operated in connection with steam boiler and the waste gases from the boiler are used for drying sprayed black liquor in accordance with my Patents Nos. 1,779,535, 1,779,536, 1,779,537, and 1,779,768 previously referred to herein.

The drawing illustrates schematically a type of apparatus suitable for carrying out my process and includes a flow sheet of the various steps of my process.

Concentrated black liquor is fed into a spray drier 10 provided with a rotary head 11 and heated by combustion gases as described in greater detail hereinbelow. The resulting spray dried powder is moved as a streaming gaseous suspension by an induced draft fan 12 through a conduit 13 to a powder collector 14, whence furnace gases are vented through a conduit 15 to a scrubber or to a stack (not shown). The powder collected by the collector 14 falls through a rotary valve 16 into one end of a retort 20. This retort is divided into a shallow initial charring zone 20a and a deeper destructive distillation or final charring zone 20b. The spray dried powder is allowed to fall into that end of the initial charring zone away from the final charring zone and moved through the initial charring zone by a screw conveyor 21. Another screw conveyor 22 moves the powder through the final charring zone 20b whence the solid residue from the distillation drops into a charbox 23. The retort 20 is housed in a retort furnace 24. Burners 25 maintain a temperature of from 1200° to 1800° F. in the initial charring zone 20a, while an auxiliary burner 26 maintains a temperature of from 550° to 650° F. in the destructive distillation zone. This temperature differential can be maintained due to the fact that the bottom of the destructive distillation zone 20b is lower than the bottom of the initial charring zone 20a and the screw conveyors 21 and 22 are large enough to have sealing contacts with the bottoms and roofs of the two retort zones.

The liquid products of the distillation escape through conduits 30 opening into domed roofs of the two distillation zones 20a and 20b, being conducted to a combined condenser and liquid seal 31 wherein the liquid level is indicated by the line 32. As shown, the conduits 30 dip below the liquid level 32. An exhauster 33 removes non-condensable gases from the condenser 31 to storage (not shown) or to furnaces through a conduit 34. Pipes 35 and 36 communicating with the condenser 31, respectively, just below the liquid level and at the bottom, serve to remove light condensate (methanol and the like) and heavy condensate (tars) to storage or to stills (not shown).

The solid residue from the distillation is emptied from the char box 23 through a rotary seal valve 40 into a conduit 41 wherein a conveyor 42 can move the charred product either to a smelting furnace 43 or to a leaching cell 44. Fused sodas from the smelting furnace 43 drain into a dissolving tank 45, so that recovered soda is obtained in the form of a clear soda liquor whether the charred product of the distillation is conveyed into the leaching tank or the furnace.

The furnace 43 is provided with boiler tubes 46 for utilizing the heat generated on combustion of charcoal for the production of steam. The combustion gases are conducted to the spray drier 10 through a conduit 47 along with waste heat gases from the retort furnace 24 admitted through a duct 48. Combustion in the furnace 43 is aided by air blasts 49.

The washed char from the leaching cell 44 may be burned in the furnace 43.

It will be noted that the above described apparatus constitutes a closed system from which inorganic dusty material cannot escape, whereby losses of sodium compounds are minimized. The use of the boiler furnace gases for spray drying is one factor minimizing the loss of sodium compounds, the other being the lowered smelter furnace temperature made possible by the two step destructive distillation including an initial high temperature charring step followed by a low temperature destructive distillation step. The disposition of the destructive distillation retort zone below the initial charring retort zone aids in keeping the distillation retort relatively cooler. This end is also reached by provision of separate exits for gases from the two retort zones and by the use of screw conveyors large enough to act as rotary seals within the retort zones.

Other points to be noted include the complete exclusion of air from the retort by means of rotary and liquid seals; the complete utilization in spray drying of heat generated in the retort and smelter furnaces; the utilization of char produced in the destructive distillation for the production of steam; and the fact that a single unitary apparatus has been provided for recovering from concentrated black liquor all heat, organic and inorganic values to be found therein.

The principles of this invention are not limited to the above described preferred examples. Many details of procedure and structure may be varied within a wide range without departing from said principles, and it is therefore not my intention to limit the patent granted on this invention otherwise than necessitated by the scope of the appended claims.

I claim as my invention:

1. The method of recovering by-products from waste liquors obtained in the soda pulp process which includes spray drying said liquors, advancing the resulting spray dried solids in a loosely powdered condition, subjecting said solids while being so advanced to a sufficiently high temperature partially to char the same and thus convert the same directly into a relatively friable and non-sticky state, destructively distilling said partially charred solids while the same are kept in motion, said charring and distilling being carried out in sealed space, recovering the solid residue from said distillation separately from the volatile products thereof, burning said recovered solid residue, separating soluble inorganic matter from the solid products of said burning step and spray drying additional amounts of said waste liquors in the volatile products of said burning step for utilizing the heat content thereof and for washing out soluble inorganic matter suspended therein.

2. The method of recovering by-products from waste liquors obtained in the soda pulp process which includes spray drying said liquors, advancing the resulting spray dried solids in a loosely powdered condition, subjecting said solids while being so advanced to a sufficiently high temperature partially to char the same and thus convert the same directly into a relatively friable and non-sticky state, destructively distilling said partially charred solids while the same are kept in motion, said charring and distilling being carried out in sealed space, recovering the solid residue from said distillation separately from the volatile products thereof, burning said recovered solid residue, extracting soluble inorganic matter from the solid products of said burning step, and spray drying additional amounts of said waste liquors in the volatile products of said burning step for utilizing the heat content thereof and for washing out soluble inorganic matter suspended therein.

3. In apparatus for recovering values from liquors obtained in the soda pulp process including a chamber for spray drying such liquors, a retort seated in a furnace for destructively distilling the spray dried liquors, and a furnace for burning the solid residue from the destructive distillation, the improvement comprising means for conveying spray dried material from said chamber to said first retort, means for conveying solid material from said retort to said furnace for burning the solid residue from the destructive distillation, means for conducting heated gases from said retort furnace to said chamber, and means for conducting to said chamber heated gases from said furnace operative for burning the solid residue from the destructive distillation.

EDWARD G. GOODELL.